United States Patent [19]

Hamidian

[11] Patent Number: 4,801,969
[45] Date of Patent: Jan. 31, 1989

[54] SELF-COILING EXPOSURE SHADE
[75] Inventor: Gabriel Hamidian, Rochester, N.Y.
[73] Assignee: Eastman Kodak Company, Rochester, N.Y.
[21] Appl. No.: 108,603
[22] Filed: Oct. 15, 1987
[51] Int. Cl.$^4$ .............................................. G03G 15/00
[52] U.S. Cl. ..................................... 355/8; 355/14 E; 355/67; 355/71
[58] Field of Search ...................... 355/8, 67, 71, 14 E

[56] References Cited
U.S. PATENT DOCUMENTS

| | | |
|---|---|---|
| 3,677,633 | 7/1972 | Huber . |
| 3,724,944 | 4/1973 | Sugita et al. ..................... 355/67 X |
| 3,771,866 | 11/1973 | Ogawa . |
| 3,807,856 | 4/1974 | Rodriquez . |
| 4,050,812 | 9/1977 | Koizumi et al. . |
| 4,129,373 | 12/1978 | Ogura et al. . |
| 4,129,376 | 12/1978 | Yotsukura . |

Primary Examiner—A. C. Prescott
Assistant Examiner—Jane Lau
Attorney, Agent, or Firm—Lawrence P. Kessler

[57] ABSTRACT

An improved electrophotographic reproduction apparatus having a photoconductive member mounted for movement about a closed loop path in operative relation to electrophotographic process stations and a movable scanning mechanism for optically exposing the photoconductive member to a light image of a document to be reproduced. The improvement comprises a self-coiling exposure shade for preventing unwanted illumination from exposing the photoconductive member. The exposure shade includes an opaque, low reflectance, sheet material treated to coil on itself. One end of the material is connected to the scanning mechanism and the opposite end is associated with a support rod oriented coaxially with the coiled material. As the scanning mechanism moves in a direction to pull on the exposure shade, the shade will uncoil; and when the scanning mechanism moves in the opposite direction, the shade will coil on itself about the support rod.

10 Claims, 4 Drawing Sheets

SELF-COILING EXPOSURE SHADE

RELATED APPLICATION

This application is related to U.S. patent applications Ser. No. 081,765, entitled MULTI-MODE ELECTROPHOTOGRAPHIC REPRODUCTION APPARATUS, filed on Aug. 5, 1987, in the name of William H. Bruce, Jr.

BACKGROUND OF THE INVENTION

This invention is directed in general to electrophotographic reproduction apparatus, and more particularly to a self-coiling exposure shade for preventing unwanted illumination of the photoconductive member of an electrophotographic reproduction apparatus.

Electrostatographic reproduction apparatus, and particularly electrophotographic apparatus, typically reproduce information by exposing a uniformly charged dielectric member to an image of information. For example, a light image of information to be reproduced modifies the uniform charge on the photoconductive surface of a dielectric member so as to form a charge pattern, or latent image, on the surface corresponding in an image-wise configuration to the information to be reproduced. Pigmented marking particles, exhibiting a charge of opposite polarity to that of the latent image charge pattern, are brought into contact with the photoconductive surface and adhere to the areas of the surface where the charge pattern exists to develop the latent image and form a transferable image. Thereafter, the transferable image is transferred to a receiver member and permanently fixed to such member by heat and/or pressure to form the desired reproduction.

One method for exposing the photoconductive surface involves forming a light image of a document by directing light from a lamp assembly at a document. The light reflected from (or transmitted through) the document is directed through a lens unit into focus on the photoconductive surface. The light from the lamp assembly may illuminate the entire document at one time (referred to as flash exposure), or may be passed through a slit and moved relative to the document to illuminate successive line segments of the document (referred to as scan exposure).

When a document is scan exposed by moving the lens unit beneath a stationary document-supporting platen, only light directed through the lens unit should expose the photoconductive surface. That is, unwanted illumination must be prevented from reaching the photoconductive surface in order to prevent undesirable artifacts from being formed in the reproduction. Examples of typical prior art shades for preventing unwanted illumination of the photoconductive surface are shown in U.S. Pat. Nos. 3,677,633 (issued July, 18, 1972, in the name of Huber); 3,807,856 (issued Apr. 30, 1974, in the name of Rodriguez); and 4,050,812 (issued Sept. 27, 1977, in the name of Koizumi et al). The shades of the 3,677,633 and 4,050,812 patents are of the roll-up curtain type and require spring mechanisms to effect such roll up action. Such spring mechanisms add to the complexity and cost of the associated reproduction apparatus. The 3,807,856 patent employs a collapsing bellows as the exposure shade. While no spring mechanism is required for moving the bellows with the lens unit, the use of a bellows necessitates a substantial area in which to accommodate the bellows. This increases the size of the exposure portion of the associated reproduction apparatus.

SUMMARY OF THE INVENTION

This invention is directed to an improved electrophotographic reproduction apparatus having a photoconductive member mounted for movement about a closed loop path in operative relation to electrophotographic process stations and a movable scanning mechanism for optically exposing the photoconductive member to a light image of a document to be reproduced. The improvement comprises a self-coiling exposure shade for preventing unwanted illumination from exposing the photoconductive member.

In a preferred embodiment of this invention, the exposure shade includes an opaque, low reflectance, sheet material treated to coil on itself. One end of the material is connected to the scanning mechanism and the opposite end is associated with a support rod oriented coaxially with the coiled material. As the scanning mechanism moves in a direction to pull on the exposure shade, the shade will uncoil; and when the scanning mechanism moves in the opposite direction, the shade will coil on itself about the support rod. The use of a self-coiling material eliminates the need for spring mechanisms to accomplish roll up action for the exposure shade.

According to another embodiment of this invention, the material of the exposure shade is selected to have a characteristic spring-like action as it coils on itself to effect movement of the scanning mechanism in such opposite direction. This eliminates the need to drive the scanning mechanism in two opposite directions. Further, torque for coiling the material may be tailored so that movement of the scanning mechanism by the coiling action can be controlled to prevent damage to, or vibration in, the apparatus as the scanning mechanism returns to its home location.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 2a is a front elevational view of an alternate embodiment of the self-coiling exposure shade, and its support, according to this invention;

DESCRIPTION OF THE PREFERRED EMBODIMENTS

Figure 1:
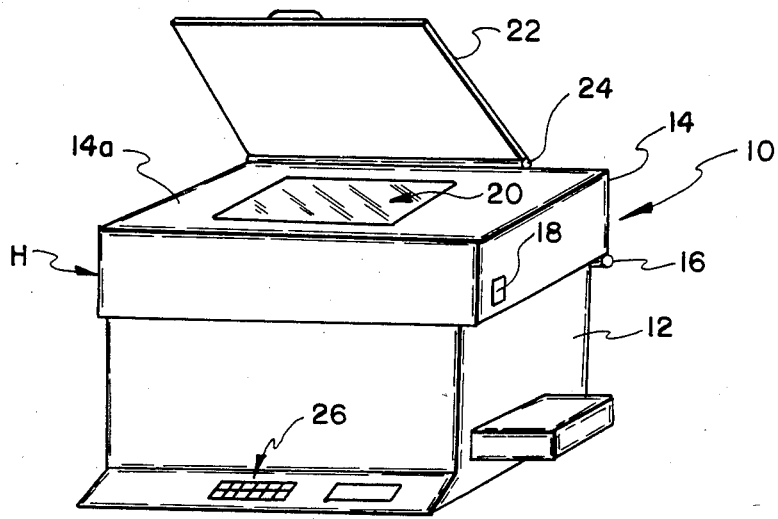
FIG. 1 is a view, in perspective, of an exemplary electrostatographic reproduction apparatus in which this invention is utilized.
Figure 2:
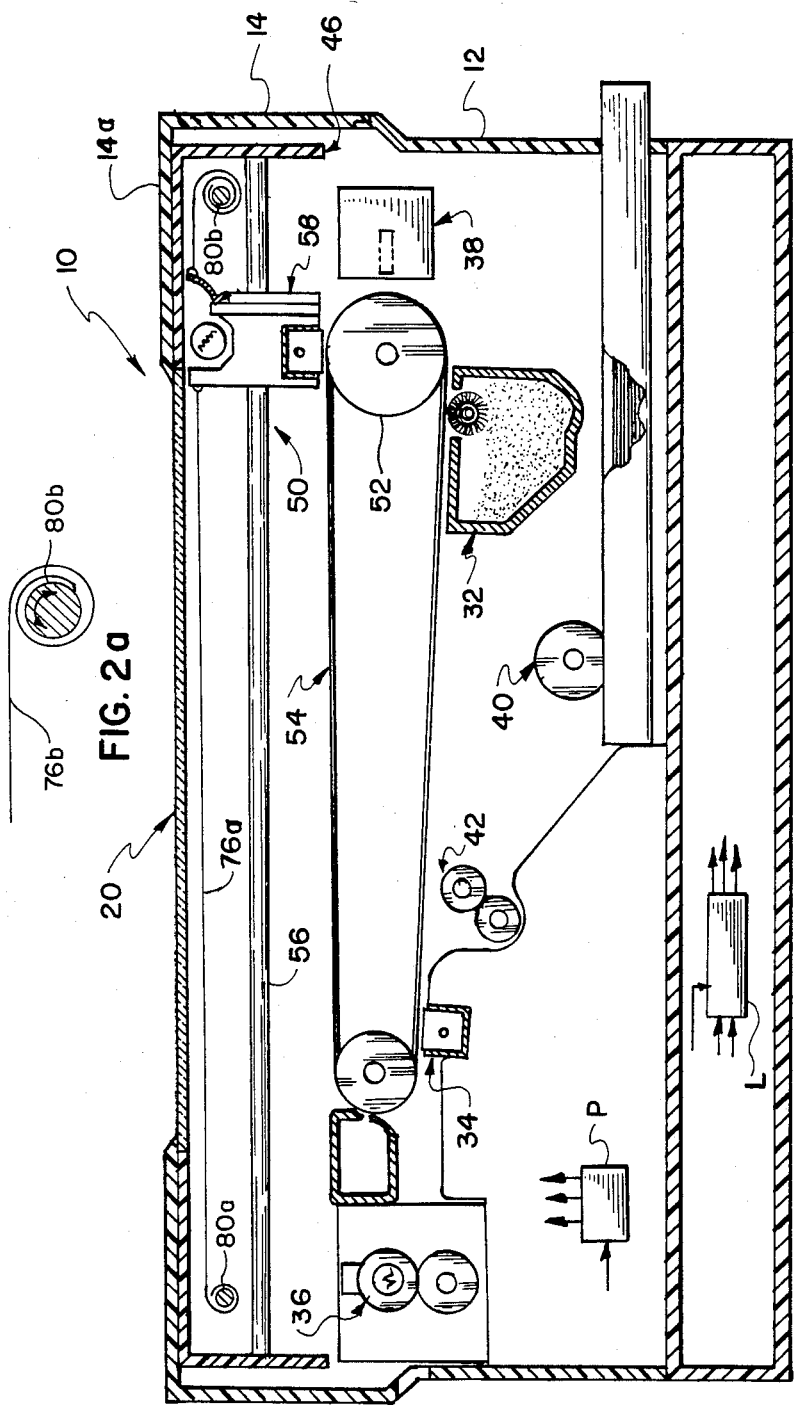
FIG. 2 is a front elevational view of the electrostatographic reproduction apparatus of FIG. 1 on an enlarged scale, in cross-section, and with portions broken away or removed to facilitate viewing of the self-coiling exposure shade, and its support, according to this invention.
Figure 3:
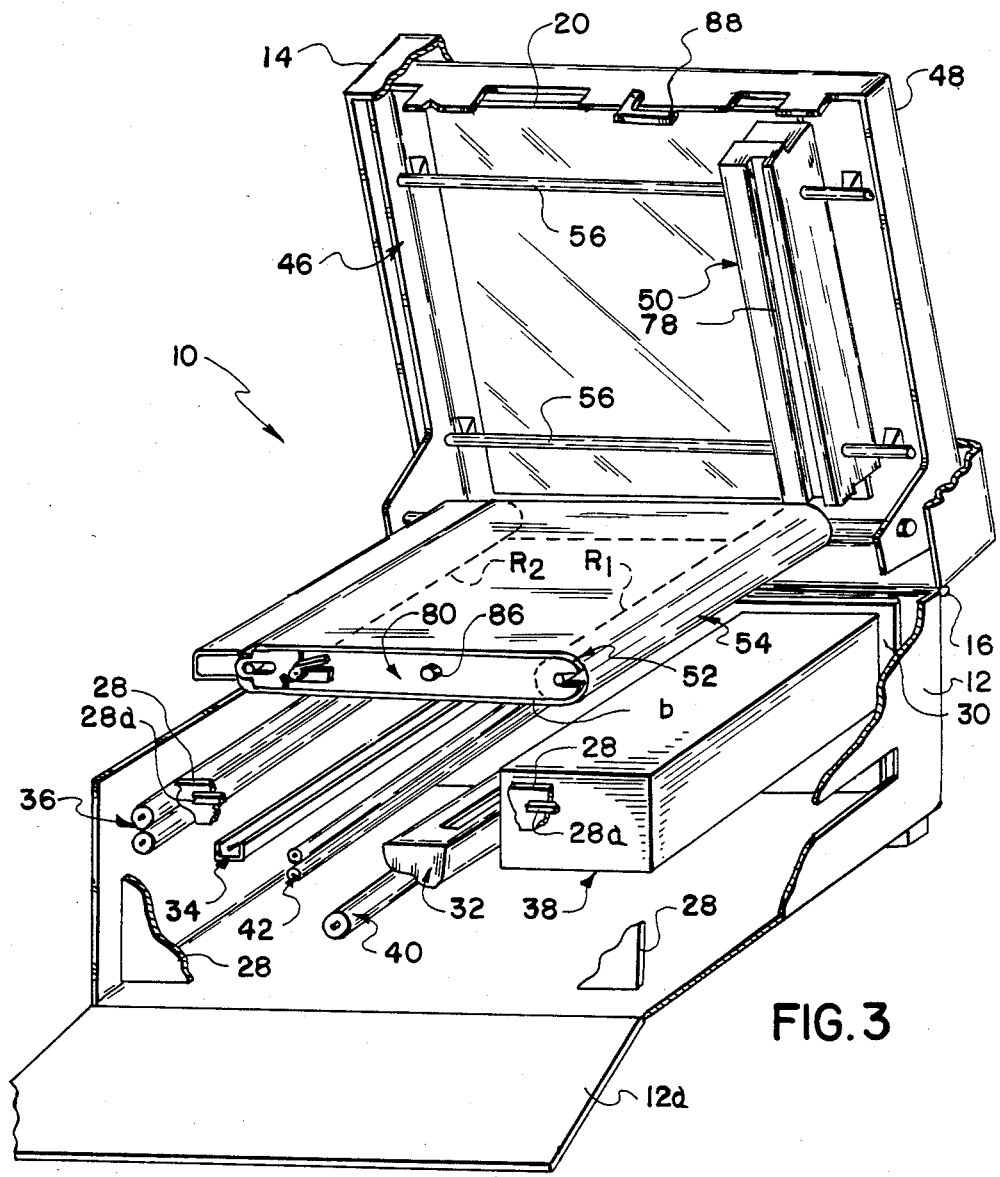
FIG. 3 is a view, in perspective, of the electrostatographic reproduction apparatus with portions in a position to enable ready access to the apparatus interior.

Referring now to the accompanying drawings, FIGS. 1-3 show a multi-mode electrophotographic reproduction apparatus, designated generally by the numeral 10. Of course, the reproduction apparatus 10 is only exemplary, and this invention is suitable for use with other electrophotographic reproduction apparatus. The reproduction apparatus 10 and its operation, which are fully disclosed in the aforementioned related U.S. patent application Ser. No. 081,765, are described herein only in such detail as to permit a full understanding of this invention. Particularly, the apparatus 10 includes a housing H having a lower portion 12 and an upper portion 14 interconnected by a hinge mechanism 16. The upper and lower housing portions 12, 14 are retained in a closed relation by a latch 18, with release of the latch enabling the portions to be opened (see FIG. 3) to permit access to the interior of the apparatus 10. The upper portion 14 has a stationary transparent platen 20, formed in the top surface 14a thereof, for supporting a document to be optically reproduced. An opaque cover member 22 is connected to the upper portion 14 by an articulating hinge mechanism 24. The member 22 is thus capable of covering a document placed on the platen 20 for optical reproduction, or articulated to hold a book (or other three dimensional object to be optically reproduced) on the platen. A front panel 12a of the lower portion 12 of the housing H is opened to provide access to the interior of the apparatus 10.

The lower portion 12 of the housing H has a control panel 26, located at the bottom front thereof beneath the panel 12a. The control panel 26 is operatively coupled to a logic and control unit L for the apparatus 10 and enables an operator to select operating parameters for the apparatus and monitor its functions. The logic and control unit L includes, for example, a microprocessor receiving operator input signals and timing signals. Based on such signals and a program from the microprocessor, the unit L produces signals to control the operation of the apparatus 10 for carrying out the reproduction process. The production of the program for a number of commercially available microprocessors such as an INTEL Model 8080 or Model 8085 microprocessor (which along with others are suitable for use with this invention) is a conventional skill well understood in the art. The particular details of any such program would, of course, depend on the architecture of the designated microprocessor.

A pair of oppositely disposed machine plates 28, 30, are located within the lower portion 12 of the housing H. The plates serve to locate, and relatively position, various elements utilized in the electrostatographic process for image reproduction. Such elements include, for example, a magnetic brush developer station 32, a transfer charger 34, and a heat/pressure fuser assembly 36. Additionally, the plates support a mechanism 38 for reproducing electronically generated information, a receiver member feed mechanism 40, and receiver member registration mechanism 42. Further, a drive assembly is supported by the rear plate 30. The drive assembly includes a motor, gear train and a plurality of clutches interrelated a well known manner for effecting operation of various components and elements of the apparatus 10. Of course, other drive assemblies, such as belts and pulleys, are suitable for use with this invention.

The upper portion 14 of the housing H contains a supporting member 46 in the form of a rigid frame 48. The frame serves to locate and relatively position an optical exposure assembly 50 and an assembly 52 for supporting a photoconductive belt 54. The photoconductive belt 54 is a composite dielectric member including a typical photoconductive material layer such as shown, for example, in U.S. Pat. No. 3,615,414, issued Oct. 26, 1971 in the name of Light. Of course, other organic or inorganic photoconductive materials are suitable for use with this invention.

The optical exposure assembly 50 comprises a pair of rails 56 fixed to the frame 48 beneath, and outboard of, the platen 20. A carriage 58 is slidably mounted on the rails 56. The carriage 58 comprises a housing extending, in the direction from front to back of the apparatus 10, substantially the full length of the platen 20. Movement of the carriage 58 along the rails 56 is accomplished by the drive assembly which is coupled to a spool 62 through a clutch (not shown). The spool 62 is, in turn, connected to one side of the carriage 58 through a wire 66 (see FIG. 4), wound up on the spool on actuation of the clutch to move the housing along the rails from a parked position (shown in FIG. 2) to a remote position a distance substantially equal to the width of the platen 20. A spring 68 connected to the opposite side of the carriage 58 urges the carriage in a direction whereby the carriage is returned to its parked position on deactuation of the clutch.

Figure 4:
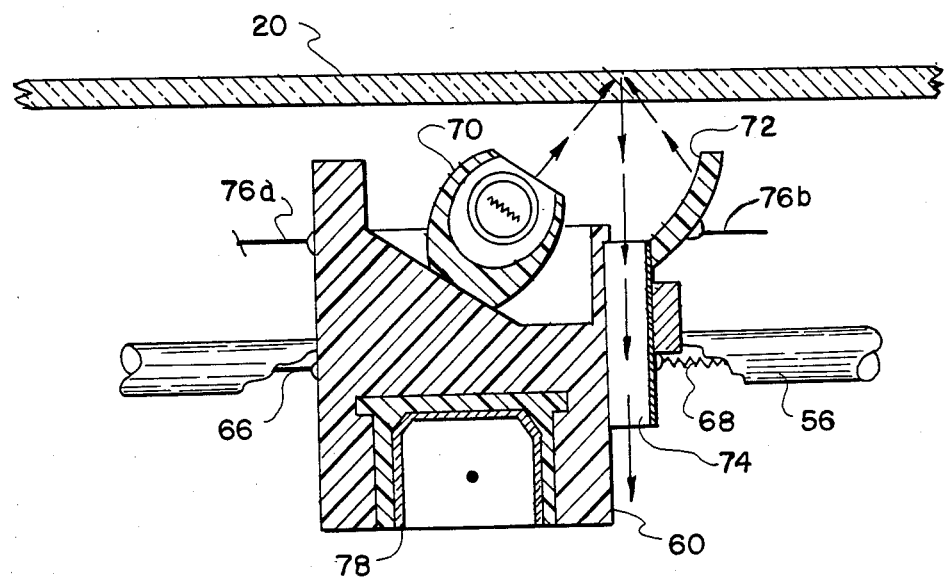
FIG. 4 is a front elevational view of the optical exposure assembly, including the self-coiling exposure shades according to this invention, on an enlarged scale, in cross-section and with portions broken away or removed to facilitate viewing.

As best shown in FIG. 4, the carriage 58 of the optical exposure assembly supports a socket 68 for an exposure lamp 70. An integral reflector 72 extends from the 58 and cooperates with the socket 68 to direct light from the lamp 70, when energized, in a line segment toward the platen 20. Such light reflects off of a document on the platen as the carriage 58 is moved by the drive assembly from its parked position along the rails 56. A lens assembly 74 is supported by the carriage 58 at a location which enables the reflected light image to be focused on the photoconductive belt 54. The lens assembly 74 may be, for example, a linear lens array which extends for the full dimension of the platen 20 in the direction transverse to the direction of movement of the carriage 58 along the rails 56.

As best shown in FIG. 2, a pair of coiled exposure shades 76a, 76b are respectively coupled at one end to opposite sides of the carriage 58. The opposite ends of the shades are respectively supported on rods 80a, 80b. The rods may be fixed in the frame 48 with their longitudinal axes substantially coaxial with the respective coiled shades. In such instance, the exposure shades wind/unwind, with the carriage 58, by sliding action about the rods 80a, 80b. Alternatively, the rods may be supported for free rotation in the frame 48 with their longitudinal axes substantially coaxial with the respective coiled shades. The ends of the rods associated with the respective exposure shades are attached to the rods (see shade 76b' attached to rod 80b' in FIG. 2a). In this instance, the exposure shades wind/unwind, with the carriage 58, with the rods being rotated about their longitudinal axes by the coiling action of the shades. As the shades 76a, 76b wind/unwind with the carriage 58, they permit light passing through the lens assembly 74 to expose the photoconductive belt 54 and prevent unwanted illumination from reaching (and thus exposing) the belt.

The carriage 58 also supports a primary corona charger 78, which is located immediately upstream of the lens assembly 76 and similarly extends for the full dimension of the platen 20 in the direction transverse to the direction of movement of the carriage 58 along the rails 56. The charger 78 is energized by a power supply source P to provide for placement of a uniform electrostatic charge on the photoconductive belt 54.

According to this invention, the exposure shades 76a, 76b are substantially opaque, generally low reflective, sheets of material. The material is of the type in which the opacity is at least of a degree which will block actinic radiation to which the photoconductive belt 54 is responsive; and which, upon suitable treatment, will take a severe core-set. Such core-set causes the material to normally coil (roll up) on itself. Many thermoplastic polymeric film materials can be treated to take a severe core-set and are thus suitable for use with this invention. An example of material suitable for use in this invention is poly(ethylene terephthalate) film containing a pigment or dye which renders the film black. Such film has a thickness in the range of about 2 to 12 mil. Treatment of the poly(ethylene terephthalate) film to give it its severe core-set, which will cause it to coil on itself, involves rolling the material and subjecting it to elevated temperature for a period of time. For example, a 2.5 mil black poly(ethylene terephthalate) film can be rolled up on a 1.8 cm wooden rod, interleaved with paper and incubated for about 10 hours at 250–300 F. Later, to induce permanent heat relaxation, the incubated roll is kept for 8 hours at 160 F.

It has been found that heavier gauge poly(ethylene terephthalate) takes a similar severe core-set except that it develops a larger spring constant, i.e., it takes a greater force to unwind the film. Accordingly, if the exposure shade 76a is made of such heavier gauge poly(ethylene terephthalate), it can be used to return the carriage 58 to its parked position after exposure of the photoconductive belt is completed. This enables the return spring 68 to be eliminated. Further, the torque for coiling the material may be tailored so that movement of the carriage 58 by the coiling action of the material can be controlled to prevent damage to, or vibration in, the apparatus as the housing 60 returns to its parked location.

With the described electrophotographic reproduction apparatus, the self-coiling exposure shade, according to this invention, unwanted illumination is prevented from exposing the photoconductive member. The shade functions in a passive manner; i.e., requires no positive drive or spring mechanism to effect coiling action. Moreover, such exposure shade may be tailored so as to be capable of acting as a return drive for the scanning mechanism.

The invention has been described in detail with particular reference to a preferred embodiment thereof, but it will be understood that variations and modifications can be effected within the spirit and scope of the invention.

I claim:

1. In an improved electrophotographic reproduction apparatus having a photoconductive member mounted for movement about a closed loop path in operative relation to electrophotographic process stations and a movable scanning mechanism for optically exposing the photoconductive member to a light image of a document to be reproduced, the improvement including a self-coiling exposure shade for preventing unwanted illumination from exposing said photoconductive member, said exposure shade comprising;

an opaque, low reflectance, sheet material treated to coil on itself; and a support member, one end of said sheet material being connected to said scanning mechanism and the opposite end being associated with said support member in such a manner so that as said scanning mechanism moves in a direction to pull on said sheet material, said sheet material uncoils, and as said scanning mechanism moves in the opposite direction, said sheet material self coils about said support member.

2. The invention of claim 1 wherein said support member includes a rod oriented coaxially with the coiled sheet material.

3. The invention of claim 1 wherein said sheet material is polyethylene terephthalate.

4. The invention of claim 3 wherein the thickness of said polyethylene terephthalate sheet material is in the range of about 2 to 12 mil.

5. The invention of claim 1 wherein said sheet material has a spring constant sufficient, on coiling, to effect movement of said scanning mechanism.

6. An electrophotographic reproduction apparatus having a photoconductive member mounted for movement about a closed loop path in operative relation to electrophotographic process stations and a scanning mechanism movable between a parked position and a remote position for optically exposing the photoconductive member to a light image of a document to be reproduced, said reproduction apparatus including means for preventing unwanted illumination from exposing said photoconductive member, said preventing means comprising;

a first self-coiling exposure shade including a substantially opaque, generally low reflectance, sheet material treated to coil on itself, and a first support member, one end of said sheet material being connected to one side of said scanning mechanism, in the direction of travel, and the opposite end being associated with said first support member in such a manner so that, as said scanning mechanism moves toward its remote position, it pulls on said sheet material to uncoil said sheet material, and as said scanning mechanism moves toward its parked position, said sheet material is free to self coil about said first support member; and a second self-coiling exposure shade including an opaque, low reflectance, sheet material treated to coil on itself, and a second support member, one end of said sheet material being connected to the other side of said scanning mechanism, in the direction of travel, and the opposite end being associated with said second support member in such a manner so that, as said scanning mechanism moves toward its parked position, it pulls on said sheet material to uncoil said sheet material, and as said scanning mechanism moves toward its remote position, said sheet material is free to self coil about said second support member.

7. The invention of claim 6 wherein said first support member includes a first rod oriented coaxially with the coiled sheet material of said first exposure shade, and said second support member includes a second rod oriented coaxially with the sheet material of said second exposure shade.

8. The invention of claim 6 wherein said sheet material is polyethylene terephthalate.

9. The invention of claim 8 wherein the thickness of said polyethylene terephthalate sheet material is in the range of about 2 to 12 mil.

10. The invention of claim 6 wherein said sheet material of said first exposure shade has a spring constant sufficient, on coiling, to effect movement of said scanning mechanism from its remote position to its parked position.

* * * * *